May 10, 1966        G. M. HIPPLE        3,250,294

VALVE AND CONTROL CIRCUIT THEREFOR

Original Filed Sept. 7, 1962        4 Sheets-Sheet 1

INVENTOR
GEORGE M. HIPPLE

BY
WOOD, HERRON & EVANS

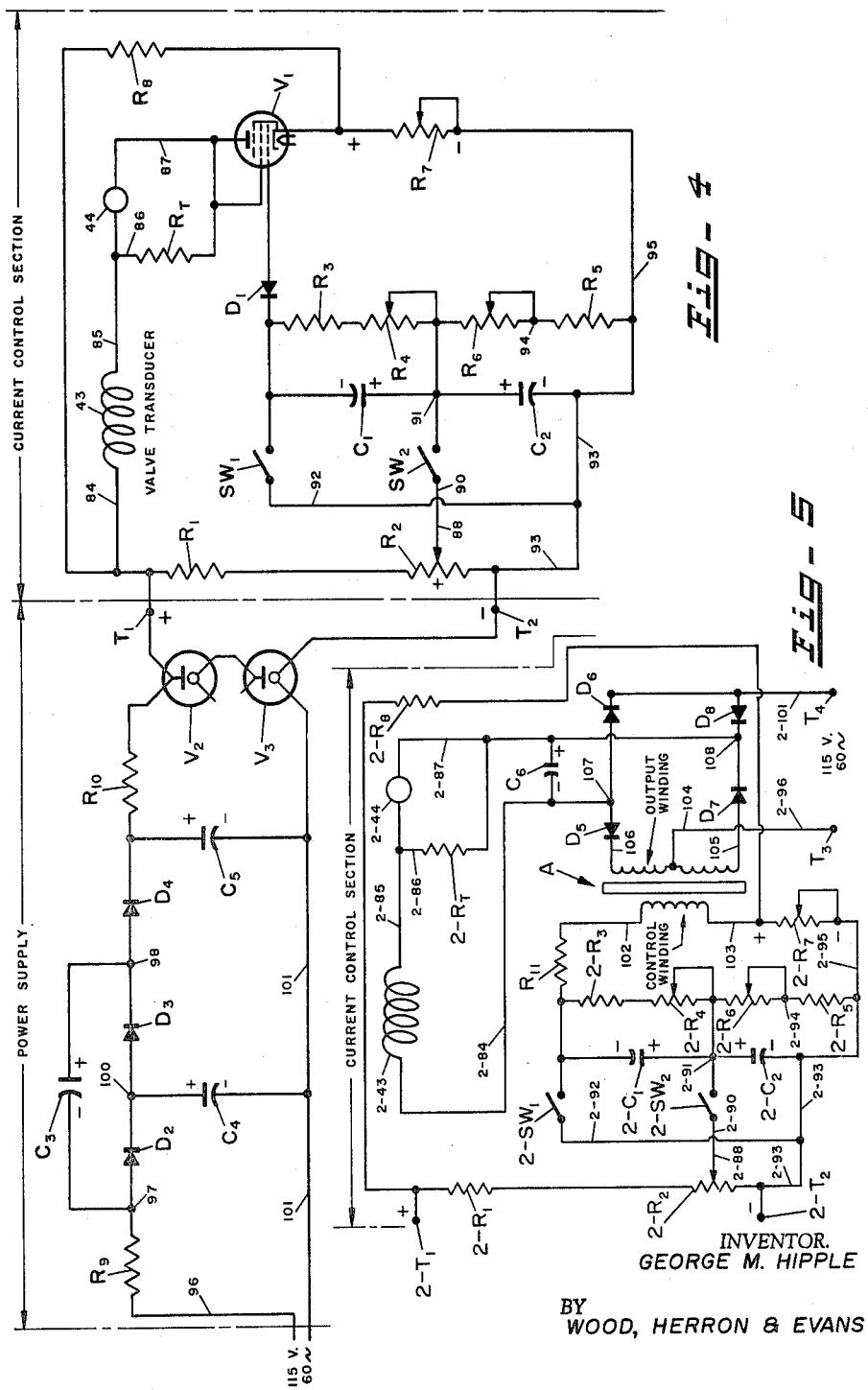

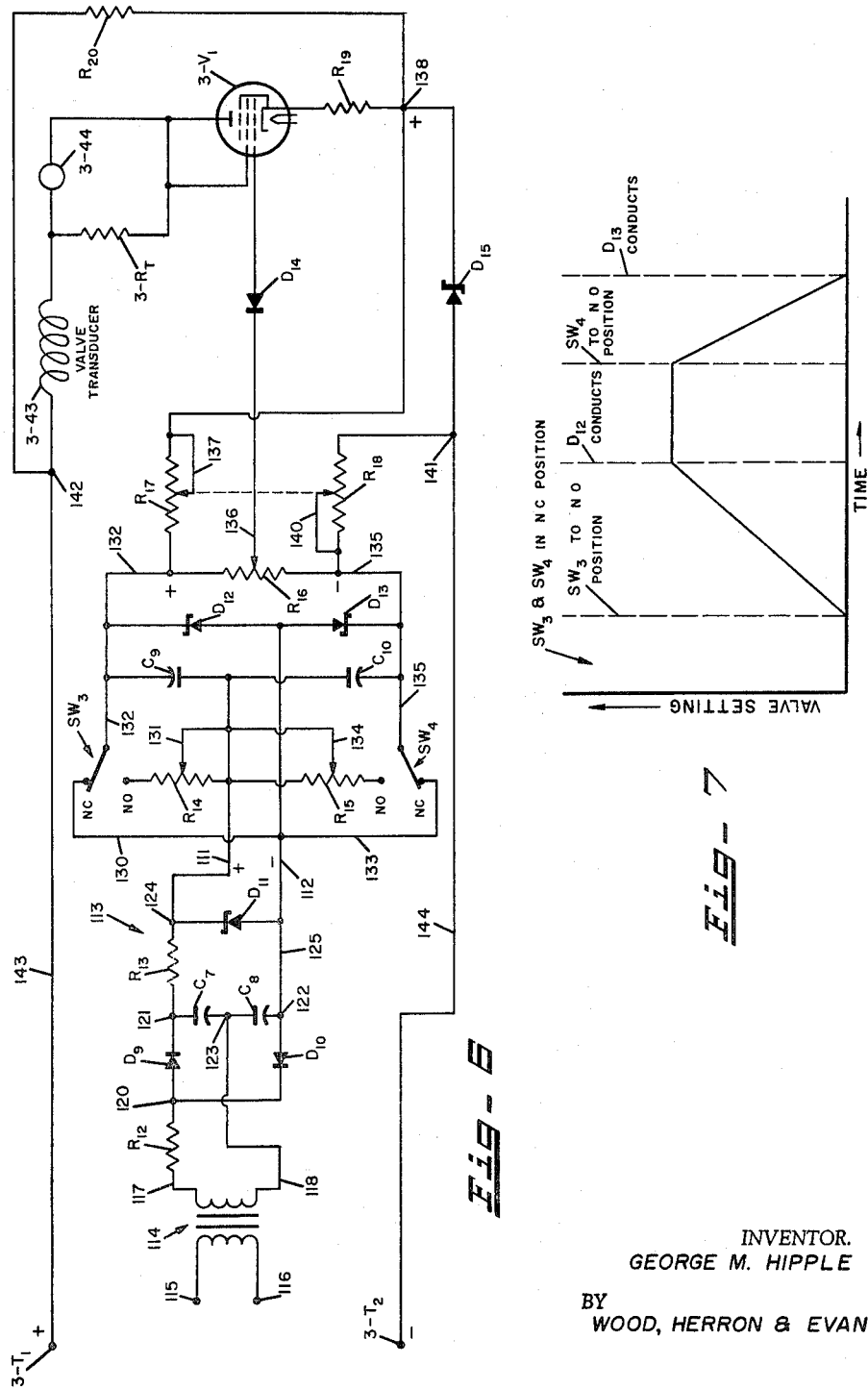

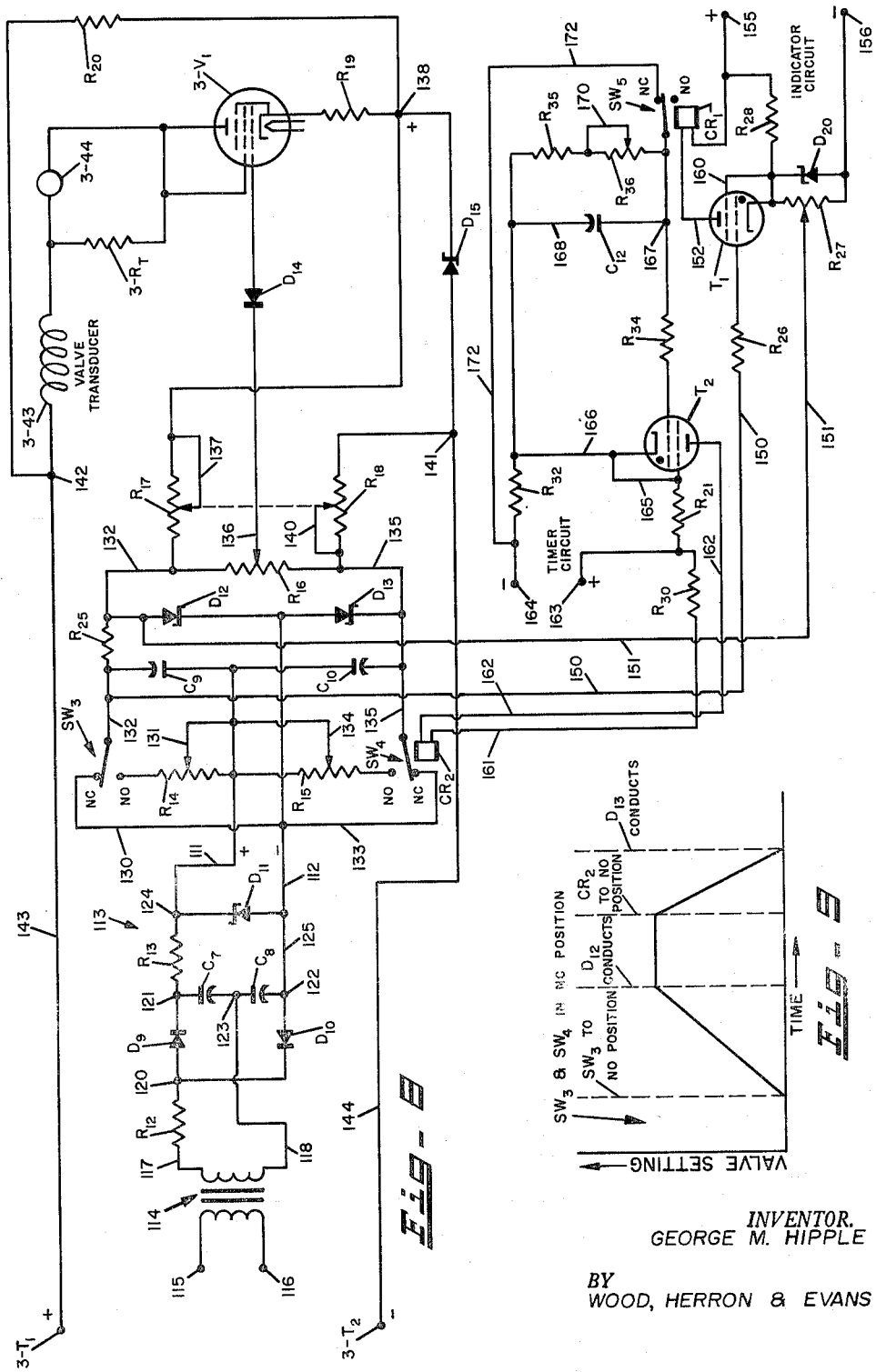

UnitedStates Patent Office 3,250,294
Patented May 10, 1966

3,250,294
VALVE AND CONTROL CIRCUIT THEREFOR
George M. Hipple, Columbus, Ohio, assignor to American Brake Shoe Company, New York, N.Y., a corporation of Delaware
Original application Sept. 7, 1962, Ser. No. 222,022. Divided and this application Nov. 5, 1964, Ser. No. 410,347
14 Claims. (Cl. 137—528)

This invention relates to hydraulic system control valves of the type which are both electrically and fluid pressure operated. More specifically, it relates to an electronic circuit for controlling the actuation of such valves.

This application is a division of my copending application Serial No. 222,022, filed September 7, 1962, which was a continuation-in-part of my earlier application Serial No. 88,594, filed February 8, 1961, now abandoned, which was in turn a continuation-in-part of my still earlier application Serial No. 48,881, filed August 11, 1960, now abandoned.

Electrically and fluid pressure operated valves of the type in conjunction with which the control circuit of the present invention is adapted for use are characterized by the ability to control fluid functions in a hydraulic system or line either proportionally or in nonlinear relation to the amount of electric current supplied to them. Such a valve is shown in co-pending United States patent application Serial No. 855,629, filed November 27, 1959, and entitled "Electric and Fluid Pressure Operated Valve Mechanism." Valves of this general type may be employed for various purposes, for example, to maintain predetermined pressure in an hydraulic system or portion thereof, in response to an electric current supplied thereto, or as sequence or pressure reducing valves, as well as for other functions.

In the valve of the above mentioned application, continuous direct current is applied to an electromechanical transducer in a control or servo portion of the valve. The servo mechanism yieldably opposes the fluid pressure in a control chamber which pressure, in turn, controls a poppet type main pressure valve. The transducer, which delivers a substantially constant mechanical force for any given electrical input, indirectly and with hydraulic assistance maintains the main poppet valve in closed position until the fluid pressure in the control chamber overcomes the mechanical force of the transducer and then permits the main poppet to open, thereby controlling the pressure in the main circuit by reducing or releasing it; thereafter the force of the transducer indirectly and with hydraulic assistance controls the main poppet to maintain the pressure in the control chamber at a substantially constant level. While the control circuit of this invention is primarily intended for use with a valve of the type shown in the aforesaid United States patent application Ser. No. 855,629, it is inherently suited for use in conjunction with other electrically and fluid pressure operated control valves which include electromagnets or other transducers for controlling the operation of a movable valve element in response to an electrical current supplied to the transducer.

Briefly, it is the objective of the present invention to provide a control circuit adapted for use with an electrohydraulically actuated valve whereby control of hydraulic fluid by the valve automatically may be caused to vary gradually or lineally over an extended period of time, and whereby such control may be effected automatically in accordance with a pre-established, time sequence. In conventional solenoid operated valves, the control function is effected abruptly; i.e., the solenoid when energized closes or opens the valve almost instantaneously. In contrast with such operation, the present invention contemplates the combination of an electrohydraulic valve and electrical control circuit which together are effective to cause transitional changes of valve setting gradually or lineally, at individually controlled rates and in a timed controlled pattern, such that a fluid function, e.g. pressure, as controlled by the valve member of the combination, may be caused to rise, fall or be maintained steady over adjustable periods of time as desired to enable best performance of the hydraulic equipment which the valve serves.

A further object of the invention has been to provide an electrohydraulic valve and control circuit therefor through which valve control of hydraulic fluid may be caused to be exerted gradually or lineally in an automatic way either as an incident to the actuation of an electric switch or as a response to a virtually instantaneous electric signal. Thus, while electrohydraulic valves of the general type heretofore known are actuable, for example, at a predetermined pressure which is constant with time, thereby to prevent the pressure in a hydraulic system from exceeding some predetermined limit, the present invention enables such valves additionally to be actuated to provide a pressure which is not constant with time but rather which rises and/or falls at a predetermined rate. By way of illustration, a valve governed according to the present invention initially may be actuable at low pressure, as at the beginning of a sequence, then be automatically controlled to provide a gradually or lineally increasing pressure during the sequence, as in a hydraulic press operation wherein it is desired to apply low pressure to a ram at the start of an operation and gradually increase the same to a maximum over a preselected time period. As a further illustration, the present invention enables ram pressure to be maintained at a desired value for an adjustable, automatically timed period, and then to be gradually released at a constant rate over a controlled adjustable period. In other instances the system of the present invention finds utility for regulating or relieving pressure according to a predetermined time pattern in response to a signal applied automatically to the valve control circuit. Thus, depending upon its specific construction, the valve may be controlled to cause the pressure in a hydraulic system to rise from, say, 0 to 5,000 p.s.i. over a period of, say, 5 minutes or more, or to some intermediate pressure, and to maintain such pressure for a desired period, followed by further rise or fall as desired. The electric control circuit is readily adjustable both as to the rate of rise and fall, the maximum and minimum pressures to be supplied through the valve, and the period at which maximum pressure is maintained.

A preferred embodiment of the concept upon which this invention is predicated comprises an electrohydraulic valve having an electrical transducer for controlling valve setting and including a magnetomotive device which provides a mechanical valve control force proportioned or related to the electrical energy supplied to the transducer, and an electronic control circuit including a vacuum tube having a plate which is in electrical connection with the transducer and means for varying the potential of the grid of the tube with respect to its cathode, thereby to cause the plate-transducer current to change and consequently effect a controlled change in the valve setting. The grid-cathode potential controlling means preferably includes two condensers which are chargeable in opposition to each other from a source of power and which are selectively dischargeable between adjustable potential limiting means. The alternate discharge of these condensers establishes a potential across them which increases and decreases and which is applied to the grid to control the plate current in such manner that a substantially straight line rate of change of valve response with time is displayed.

Upon application of a control signal to the valve control circuit, as by throwing a switch, a gradually changing current is applied to the valve control transducer, whereby the hydraulic pressure supplied through the valve will lineally rise, fall, or be maintained constant over a predetermined period of time in accordance with the change in current effected by the control circuit. The valve may be operated at any given minimum or maximum pressure within its operating range for as long as may be desired.

The invention may best be explained in relation to the accompanying drawings, in which:

FIGURE 4 is a schematic diagram of a circuit embodying the principles of the invention, in conjunction with a regulated direct current power supply and an electrically and fluid pressure operated valve;

FIGURE 5 is a schematic diagram of a modified current control circuit in conjunction with an electrically and fluid pressure operated valve;

FIGURE 6 is a schematic diagram of a preferred circuit, in conjunction with an electrically and fluid pressure operated valve and power supply, which supplies to the valve a current changing with time in a manner effective to cause linear change of valve response with time;

FIGURE 7 is a graphical representation showing the general manner in which valve response changes with time upon actuation thereof by a circuit of the type shown in FIGURE 6;

Figures 1, 2, 3:
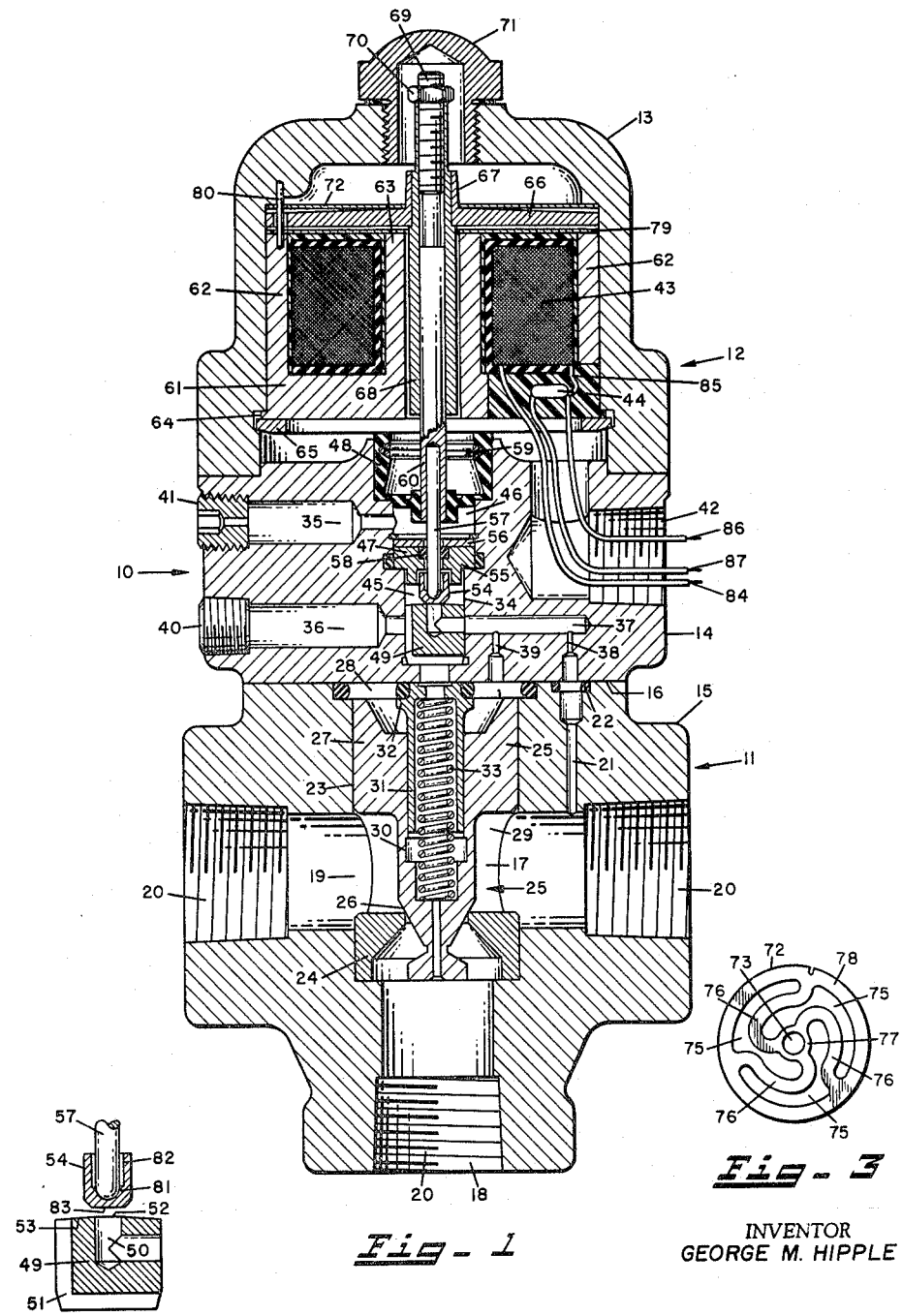
FIGURE 1 is a view in section of an electrically and fluid pressure operated valve of the general type with which the control circuit of this invention is adapted to be used, including a pressure differential operated main valve adapted to function in a hydraulic system and a control valve device for determining or controlling the operation of the main valve.
FIGURE 2 is a view in section on an enlarged scale of elements of a valve which is employed in the control section or part of the apparatus seen in FIGURE 1.
FIGURE 3 is a view on a reduced scale of a thin wheel-like diaphragm type guide element in the transducer of the electrically and hydraulically controlled valve device seen in FIGURE 1.

FIGURE 8 is a schematic diagram of a circuit including the transducer of an electrically and fluid pressure operated valve, whereby the valve setting is controlled to increase at a preselected rate to a maximum, be maintained at that maximum for a timed period, and then to drop at a preselected rate to a minimum; and FIGURE 9 is a graphical representation showing the general manner in which valve response changes with time where the valve transducer is operated by a circuit of the type shown in FIG. 8.

The particular electrically and fluid pressure operated valve 10 shown in FIGURES 1 through 3 of the drawings is an example of the type of valve with which the circuit of the invention is utilized. This valve 10 includes a main valve assembly 11 adapted to operate in a hydraulic system and a control valve assembly 12 for controlling the operation of the main valve assembly 11. As shown in the drawings, the main valve assembly 11 and the control valve assembly 12 are contained within a common body, casing or housing comprised of three body elements 13, 14, and 15. The body element 14 is attached to the body element 15 and the body element 13 is attached to the body element 14 by screws, none of which are shown in the drawings.

The body element 15 is a casting which is generally cross-shaped configuration when viewed from either side and is provided with a flat generally circular top 16 from which a stepped central vertical bore 17 extends through the body to a fluid outlet port 18. A transverse bore 19 in the body 15 intersects the vertical stepped bore 17 and forms a fluid pressure inlet or through passageway in the body 15. The port 18 as well as the ends of the bore 19 are threaded, as at 20, for permitting the valve body element 15 to be connected into a hydraulic system. The body 15 is also provided with a vertical bore or passageway 21 which extends from the high pressure bore or passageway 19 to the flat top 16 of the body element 15 where it is enlarged to receive an O-ring 22.

The bore 17 forms a cylinder 23 into the bottom of which a valve seat 24 is pressed against a shoulder. This cylinder 23 receives a combination piston and poppet type valve 25 including a valve element 26 adapted to engage and close the seat 24 and a piston portion 27. The piston portion 27 divides the cylinder 23 into an upper control pressure chamber 28 and a lower pressure chamber 29, the latter of which is in constant communication with the high pressure passageway or bore 19. The piston valve element is provided with a stepped central or axial through-bore 30 the larger diameter upper portion of which slidably receives a piston 31 which may balance the area on the top of the piston 27, which area is exposed to pressure in the control chamber 28, with that area on the bottom of the piston 27, which area is exposed to the pressure in the pressure chamber 29. In the particular valve shown, the piston 31 is slightly smaller in diameter than the opening in the valve seat 24. The upper end of the area balancing piston 31 has a small flange 32 projecting radially outwardly therefrom which receives an O-ring, and is formed to include a central internal socket which receives a compression type coil spring 33. This spring 33 abuts the wall at the upper end of the area balancing piston 31 and a shoulder in the valve element 25, and urges the valve element downwardly to close the opening in the valve seat 24. The area balancing piston 31 is also provided with a central opening in its upper end wall whereby fluid may flow through it and through bore 30 in valve element 25 to reach the outlet port 18.

The body element 14 includes a flat generally circular bottom surface adapted to mate with the top surface 16 of the body element 15 and to sealingly engage the O-ring 22 as well as the O-rings which are carried by the upper end of the area balancing piston 31 and the cylinder 23. The body element 14 is also provided with a stepped central bore 34 the axis of which is aligned with the axis of the bore 23 in body member 15, and is joined at spaced points by horizontally extending bores 35, 36 and 37. The bore 37 is connected with the bore 21 in body 15 and with the control pressure chamber 28 by a pair of restrictors in the form of orfices 38 and 39 respectively. Bore 36 is closed by a solid plug 40, while bore 35 is partially closed by a breather or vent plug 41. The body element 14 is also provided with an internally threaded passageway 42 through which pass insulated electric wires 84, 86 and 87 connected to the electric coil 43 and thermistor 44 of an electromechanical transducer assembly which is contained within the body member 13.

The bore 34 is divided into two chambers, one a wet chamber 45, and the other a dry chamber 46, by a seal and guide assembly 47 and a diaphragm in the form of a flexible boot 48 which may be made of neoprene or any other suitable flexible material. A cylindrical valve seat insert 49 (see FIGS. 1 and 2) is pressed into that portion of the stepped bore 34 which cooperates in forming the wet chamber 45 and against a shoulder at one end thereof. This valve seat 49 is provided with a right angled passageway 50 formed by two intersecting bores which connect the bore 37 in the body 14 to the center of the upper end or valve seat of the insert 49. The valve seat insert 49 also includes a fluid conducting groove 51 which extends axially along its side and across its bottom to connect the seat chamber 45 with the bore 36 and with a small diameter opening at the bottom end of the stepped bore 34 which opening is aligned and communicates with the opening in the top of the area balancing piston 31.

The upper end of the valve seat insert 49 is provided with a circular flat surface 52 which surrounds the exit of the passageway 50 and from this flat surface 52 is tapered downwardly and outwardly, as at 53, in a cone shape to its outside cylindrical walls. The flat portion 52 is provided to form a valve seat against which the flat bottom surface of a cup shaped valve element or poppet 54 is urged and the cone shaped surface 53 surrounding this flat portion is provided to reduce or eliminate friction upon fluid flowing across it from between the valve element 54 and the flat circular seat 52.

The valve element 54 is contained within the wet chamber 45 and its upper end fits loosely within an inverted cup formed in part by a cylindrical wall extending from the lower or bottom side of the seal and guide assembly 47. The clearance between the valve element 54 and the cup on the guide and seal assembly 47 is such as to permit the valve element 54 to move from the valve seat 52, and the side walls of the inverted cup on the seal and guide assembly 47 normally do not contact the side walls of the valve element 54.

The seal and guide assembly 47 includes a circular disk 55 having cylindrical outer walls and this disk is inserted into that portion of the bore 34 which cooperates in forming the dry chamber 46 and against a shoulder therein which is adjacent the upper end of the wet chamber 45. An O-ring seal which is contained within an annular groove in the bore 34 adjacent the shoulder engages the cylindrical outer wall of the disk 55 and seals it to the bore. The disk 55 is retained against axial movement in the bore 34 by a washer 56 and a snap ring, the latter being seated in an annular groove in the wall of the bore 34. The disk 55 is also provided with a central axial bore through which an operating rod 57 for the valve formed by the element 54 and seat 52 extends. This central bore is provided with a groove adjacent its top in which an O-ring 58 is inserted and this O-ring is held in the groove by the bottom surface of the washer 56.

It is pointed out that the rod 57 does not contact either the disk 55 or the washer 56 and that it is supported by the O-ring 58. By this means the rod 57 is sealed with the guide assembly 47 in a substantially frictionless manner, because the axial motion of the rod 57 is generally in the nature of not more than two thousandths of an inch under which conditions the O-ring 58 forms an antifriction bearing since it tends to roll upon the rod 57 as the latter is reciprocated.

From the foregoing, it will be seen that the seal and guide assembly 47 divides the bore 34 into the two chambers 45 and 46 and it will be apparent from FIGURE 1 of the drawings that the upper end of the dry chamber 46 is closed by the previously mentioned flexible boot 48 which is inserted into the bore 34 and against a shoulder therein. An expandible type coil spring 59 retains the boot 48 in the bore 34 and the boot is provided with a thickened elastic central portion having a bore which surrounds and sealingly elastically grips a non-magnetic brass shaft 60 which carries the rod 57.

The body element 13 is cast of a non-magnetic material such as aluminum, and it is bored to receive a core 61 in which the coil 43 and thermistor 44 of the transducer assembly are housed. The core 61 has an armature disk 66 which has high magnetic permeability and low hysteresis such as an ingot iron. The core 61 is a cup shaped cylinder having side walls 62 which provide magnetic poles and a hollow center post 63 which also provides magnetic poles. The coil 43 is embedded in an insulating plastic material in the core 61 and the thermistor 44 is embedded in the same plastic material in a notchlike opening formed in the bottom of the core 61. The outside diameter of the core 61 is such as to have a close slidable fit with the bore in the body element 13 and it is provided with a peripheral flange 64 which abuts a shoulder on the body element 13. The shoulder 64, and consequently the core 61, is clamped to the body element 13 by a snap ring 65 provided with one tapered side which seats against one side of a groove in the body element 13.

The electromagnet above described including the core 61 and coil 43 operates an armature which includes the disk 66 which has a hollow hub 67 into which a tube 68 of non-magnetic material is pressed. The armature disk 66 extends over the outside magnetic poles formed by the side walls 62 and the tube 68 extends freely through the center post or poles 63 of the core 61. The armature disk 66 does not contact the body element 13. The shaft 60 fits snugly but slidably axially within the tube 68 of the armature and its upper end is abutted by an adjusting screw 69 which is threaded into the upper end of the tube 68 and which is provided with a locking nut 70. An externally threaded hollow plug 71 which covers the screw 69 and nut 70 is threaded into the body member 13.

The upper end of the armature assembly including the disk 66, tube 68 and rods 60 and 57 is supported against lateral movement by a thin diaphragm 72 of non-magnetic material. This diaphragm 72 (see FIGURE 3) is provided with a central opening 73 which fits snugly around the tapered hub 67 of the disk 66 and its outer edge abuts the walls of the bore in the housing member 13. In order that the diaphragm 72 may support the armature for substantially unrestrained axial movement with substantially no lateral movement, the diaphragm 72 is cut out as at 75 to provide curved flexible connecting portions or spokes 76 between its hub 77 and rim 78 which rim engages the body element 13 at its peripheral edge and its top.

A thin spacer washer 79 which is also formed of non-magnetic material is positioned between the armature disk 66 and the magnetic poles formed by walls 62 and center post 63 of the core 61. This spacer washer 79 does not contact the tube portion 68 of the armature, but its peripheral edge preferably abuts the body element 13 in order to prevent movement of the spacer washer with respect to it and the core 61.

Rotation of the diaphragm 72, the spacer washer 79 and the core 61 with respect to each other and the body element 13 is prevented by a non-magnetic pin 80 which extends through the members 72, 66 and 79 and into aligned openings, one in the body element 13 and one in the core 61. The opening in the armature disk 66 through which pin 80 extends is of a larger diameter than that of the pin 80 in order that should the disk 66 contact the pin 80 during operation of the device there will be substantially no frictional resistance between them, and the pin 80 is extended through the disk 66 for the purpose of holding it against rotation during adjustment of the screw 69 and nut 70.

The valve mechanism 10 described above is an electrically and fluid pressure controlled relief type control valve adapted to have its transverse bore 19 connected with or into a conduit in which it is to control fluid pressure. When the valve mechanism 10 is so connected, its outlet port 18 will usually be connected to a tank or reservoir which is under atmospheric pressure.

It will be apparent from the following description that the main valve assembly 11 is operated by a pressure differential and the spring 33 and that when the valve mechanism 10 is connected as above described and its transducer closes the valve 52, 54, fluid pressure in the transverse bore 19 and chamber 29 is applied to the underside of the piston portion 27 of the valve element 25 and this same pressure is also applied to the chamber 28 and the top of the piston portion 27 through the restricted passageway including the passageway 21, the orifice 38, bore 37 and orifice 39. Since the areas on the top and bottom of the piston portion 27 which are exposed to the fluid pressure are substantially equal, the valve element 25 will be urged downwardly by the spring 33 and its valve portion 26 closes the seat 24 and isolates the outlet port 18 from the bore 19.

The pressure limiting and shut-off valve 52, 54 in the chamber 45 and the orifice 38 function to control the pressure differential, i.e., the difference in pressure in the chambers 28 and 29 and when fluid is permitted to flow through the valve 52, 54 the fluid enters the wet chamber 45 and flows to the outlet port 18 through the groove 51, the aligned openings in the bottom of the bore 34 and the top of the area balancing piston 31, through the piston 31 and the center of the valve element 25 to port 18.

It will be seen that when fluid pressure in the transverse bore 19, chambers 28 and 29 and the passageways 21 and 37, acting upon the valve element 54, overcomes the magnetic force of the transducer, fluid will begin to flow through the pressure limiting and shut-off valve 52, 54, so that a pressure drop across the orifice 38 is created. It will also be apparent that the pressure at the high pressure side of the orifice 38 is applied to the bottom of the piston portion 27 of the valve element 25, while the reduced or lower pressure at the low pressure side of the orifice 38 is applied to the top side of the piston portion 27. When this pressure differential, i.e., the pressure drop across the orifice 38, exceeds the force of spring 33, valve element 25 will be moved upwardly and will open the main valve 24, 26 an amount which is proportional to the pressure drop. The orifice 39 between the bore 37 and the chamber 28 is provided to prevent fluttering of the valve element in the bore 17 when the valve 52, 54 is opened and/or closed quickly. This orifice preferably has a bore or internal diameter which is slightly larger than the bore in the orifice 38.

With reference to FIGURES 1 and 2 of the drawings, it will be seen that the cup shaped valve element 54 is provided with a semi-spherical socket 81 in which the semi-spherical end of the rod 57 seats. The interior side walls 82 of the cup shaped element are spaced from the rod 57 a distance sufficient to permit the element 54 to pivot or swivel upon the rod 57. This pivotal or swivel type motion permitting connection or joint between the rod 57 and the element 54 is provided to insure that the flat bottom 83 of the element 54 can and will seat properly upon the valve seat 52 even though there may be small manufacturing errors in the alignment of the various parts of the valve. The cup formed on the bottom of the disk 55 retains the valve element or poppet 54 in such position that rod 57 will enter the semi-spherical socket 81 when the rod 57 is inserted through the O-ring 58 and disk 55.

The above described valve structure is the subject of co-pending United States application Serial No. 855,629. It is to be understood that while that valve comprises a preferred valve with which the circuit to be described is adapted to be used, the circuit is not limited to use with that specific valve alone but may be utilized with other electrically and fluid operated valves in which valve response is related to an electrical current supplied to an electromechanical transducer.

As will be explained, the armature assembly of the transducer is electromagnetically urged in a direction to close the valve 52, 54, and is urged in the opposite direction by the fluid pressure acting upon the bottom surface 83 of the valve element 54. When this fluid pressure overcomes a predetermined electromagnetic force of the transducer, the valve will be opened to a position whereat the fluid forces acting upon the surface 83 exactly counterbalance electromagnetic forces. Should the fluid forces acting upon the surface 83 of the valve element 54 vary in even the slightest degree, then the opening through the valve 52, 54 will be varied to adjust the pressure drop across the orifice 38 thereby causing the position of the valve element 25 and consequently the degree of opening of the valve 24, 26 to be adjusted to maintain the desired pressure in the passageway 19. It has been found during repeated tests and in the actual operation of the control valve assembly 10 that neither of its valves 24, 26 nor 52, 54 tends to "hunt" when the electric current supplied to its coil, or pressure conditions in its passageway 19, are changed, and that the device responds quickly even to sudden changes in electric current and/or pressure.

It is well known that the magnetic forces of an electromagnet acting to attract an armature to its poles exert a force upon the armature which is inversely proportional to the square of the distance between the armature and the poles when the magnetomotive force is held constant, and for this reason the coil and core of the transducer employed in carrying out the invention are purposely made large in order that there may be a wide air gap between the armature disk 66 and the poles 62 and 63 whereby in that range (0–.002 inch) in which the armature moves the forces acting upon the armature will remain substantially constant for any given current supplied to the coil 43 and the transducer will deliver a substantially constant force within its predetermined stroke range for any given electrical input applied to it.

FIGURE 4 of the drawings shows a D.C. power supply means and an electrical control circuit in accordance with the invention by which the valve setting may be varied gradually, although not lineally. In FIGURE 4, the D.C. power supply is shown on the left between dashed vertical lines and is designated "Power Supply." The control circuit is shown on the right between dashed vertical lines and is designated "Current Control Section." It is to be understood that while the D.C. power supply here shown and hereinafter described forms the preferred means for supplying a regulated or constant voltage to the current control circuit, the current control circuit may be used with any other suitable source of constant D.C. voltage.

Referring now to the "Current Control Section," the coil 43 will tend to heat up under typical conditions of operation, which normally is accompanied by an increase in its resistance. Since this increase in coil resistance would diminish the coil current and thereby introduce a non-uniformity into operating conditions, thermistor 44 having leads 86 and 87 is preferably included in series with coil 43 by connection with coil lead 85. A resistor $R_T$ is connected in parallel with thermistor 44 between leads 86 and 87. The circuit combination of coil 43, thermistor 44, and resistor $R_T$ presents a combined resistance which varies only a minimal amount with temperature, so that the overall resistance through which the coil current passes is substantially constant. This combination of resistance elements will thus be understood to be equivalent to a temperature constant resistance.

The preferred current control circuit is supplied with a regulated 210 volt direct current at terminals $T_1$ and $T_2$, $T_1$ being positive with respect to $T_2$. Resistors $R_1$ and $R_2$ are connected in series across terminals $T_1$ and $T_2$. $R_2$ is preferably a variable resistor having an adjustable tap 88. Tap 88 is connected through lead 90 to one pole of a single pole, single throw switch $SW_2$, the other pole of which is connected to the junction 91 of a pair of capacitors $C_1$ and $C_2$ having their positive sides connected at 91. The negative side of $C_1$ is connected through a single pole, single throw switch $SW_1$ and a lead 92 to a lead 93 which is connected to $T_2$. The negative side of $C_2$ is also connected to $T_2$ through lead 93. Connected in parallel with $C_1$, between the negative side of $C_1$ and junction 91, are series resistors $R_3$ and $R_4$, $R_4$ having an adjustable tap connected to junction 91. Similarly connected in parallel with $C_2$, between junction 91 and lead 93, are two series resistors, one a fixed resistor $R_5$ and the other a variable resistor $R_6$, the tap of which is connected at the junction 94 of $R_5$ and $R_6$.

Terminal $T_2$ is connected by leads 93 and 95 through a cathode biasing variable resistor $R_7$, to the cathode of a pentode $V_1$. The grid of tube $V_1$ is connected to switch $SW_1$ and the negative side of $C_1$ through a diode $D_1$ permitting electron flow toward but not away from the grid and thereby preventing capacitor $C_1$ from being charged by a grid current. The plate of $V_1$ is connected to the valve coil 43 through parallel-connected thermistor 44 and resistance $R_7$. A plate by-pass resistor $R_8$ is connected from the cathode of the tube to $T_1$. This resistor $R_8$ is employed to provide a voltage drop across cathode-biasing resistor $R_7$ when tube $V_1$ is cut off.

The operation of the control circuit may now be explained. Assuming that the minimum current to the transducer coil 43 is to be zero, the tap of resistor $R_7$ is adjusted so that the entire resistance value of $R_7$ appears between lead 95 and the cathode of $V_1$. When a D.C. voltage is applied between $T_1$ and $T_2$ such that $T_1$ is positive with respect to $T_2$, current flows through cathode bias resistor $R_7$ and resistor $R_8$, thereby making the cathode positive with respect to $T_2$ and the grid which is connected to $T_2$. Because the grid is then very negative with respect to the cathode, the tube is cut off, no plate current flows, and valve coil 43 is not energized.

To prepare or condition the circuit for providing gradual buildup and subsequent decay of valve coil current, switches $SW_1$ and $SW_2$ are both closed.

The flow of current in $R_2$ creates a potential drop between tap 88 and $T_2$. With $SW_1$ and $SW_2$ closed, this potential is impressed across condensers $C_1$ and $C_2$ so that both charge. Tube $V_1$ remains cutoff since the grid is still negative with respect to the cathode by reason of the potential drop across the cathode bias resistor $R_7$. Once $C_1$ and $C_2$ have become charged, the circuit is then conditioned for operation.

To initiate the increase or build-up of current in coil 43, switch $SW_1$ is opened. This removes the potential previously applied across $C_1$, so that $C_1$ begins to discharge at a rate determined by its capacity and the combined resistance of $R_3$ and $R_4$. The grid potential is initially of a high negative value but since the grid is connected with the negatively charged side of $C_1$, its negative value decreases exponentially as $C_1$ discharges through $R_3$ and $R_4$. As the grid potential decreases, the plate current is initiated, so that current flows in the coil. As the current in the coil increases, the force the valve transducer exerts on poppet valve element 54, for example, also increases. In this manner the pressure applied, for example, to a hydraulic ram is gradually increased up to a maximum pressure corresponding to a maximum current in coil 43 when $C_1$ is entirely discharged.

Once $C_1$ has fully discharged, $SW_2$ remaining closed, the grid-cathode potential remains constant. The circuit can remain in this condition indefinitely, during which time the actuation pressure in valve chamber 28 is at its maximum.

To initiate the gradual decrease of coil current and valve actuation pressure, switch $SW_2$ is opened. This removes the applied potential from $C_2$ and permits it to discharge through $R_5$ and $R_6$. At the instant of opening switch $SW_2$, the grid-cathode potential is equal to the difference between the potential drop between tap 88 of $R_2$ and $T_2$ and the drop across $R_7$; as $C_2$ discharges, the grid-cathode voltage becomes increasingly negative, finally becoming equal to the potential across $R_7$. At the latter condition cathode bias puts the tube again in cut-off.

From the foregoing, it will be seen that the resistor-capacitor circuit between tap 88 of resistor $R_2$, terminal $T_2$, the grid of tube $V_1$, and cathode bias resistor $R_7$ is effective to offset the potential drop across resistor $R_7$ by an amount which changes gradually with time upon actuation of switches $SW_1$ and $SW_2$. As is well known, the decay of the potential across a charged condenser is not linear but follows an exponential curve. That is, upon opening switch $SW_1$, the grid-cathode potential rises exponentially. The response of the valve to the changing current in coil 43 is also non-linear. In many applications this non-linearity is unimportant. However, where a substantially linear rate of change of valve response is desired, this resistor-capacitor circuit may be replaced, for example, by the circuit shown in FIGURE 6 as is explained in detail hereinafter.

The maximum actuation pressure of the valve is determined by the specific setting of the tap 88 of $R_2$. The period of current build-up depends on the capacitance of $C_1$ and the resistance of $R_3$ and $R_4$. By adjusting the tap on $R_4$ this period may be varied. Similarly, by varying the position of the tap of $R_6$ the decay period may be adjusted. The minimum current in the valve is controlled by the variable resistor $R_7$.

Preferred parameters for the various electrical components of the control circuit are approximately as follows: $R_1$, 10K ohms; $R_2$, 5K ohms; $R_3$, 1M ohms; $R_4$, 10M ohms; $R_5$, 1M ohms; $R_6$, 10M ohms; $R_7$, 1500 ohms; $R_8$, 15K ohms; $R_T$, 5.6K ohms; $C_1$, 6 mfd.; $C_2$, 6 mfd.; tube $V_1$ is a 6CZ5 pentode, and $D_1$ may be any diode having a high reverse resistance and low current capacity.

The preferred power supply shown in the drawing is designed to operate on conventional 115 volt, 60 cycle current, and is relatively simple and compact, for which reasons it comprises a preferred, although not a necessary, adjunct to the control circuit. The power supply shown supplied a regulated or constant 210 volt direct current output to the control circuit at terminals $T_1$ and $T_2$.

Resistor $R_9$ is connected or connectable at one end to a 115 volt line through a lead 96, and is connected at the other end to the positive side of three series diodes $D_2$, $D_3$, and $D_4$. A condenser $C_3$ is connected in parallel across $D_2$ and $D_3$ at points 97 and 98. A condenser $C_4$ is connected from the junction of diodes $D_2$ and $D_3$ at point 100, to line lead 101. Condenser $C_5$ is connected from the negative side of $D_4$ to lead 101. A resistor $R_{10}$ is connected from the negative side of $D_4$ to the plate of the first of two series connected voltage regulator, cold cathode tubes $V_2$ and $V_3$. The cathode of $V_2$ is connected to the plate of $V_3$. The cathode of $V_3$ is connected to lead 101. Power is taken from the supply circuit from the plate of $V_2$, which is connected or connectable to terminal $T_1$, and from the cathode of $V_3$, which is connected or connectable to $T_2$.

Preferred parameters of the supply circuit, given only by way of example, are as follows: $R_9$, 47 ohms; $R_{10}$, 6K ohms; $C_3$, $C_4$ and $C_5$, 20 mfds.; $D_2$, $D_3$ and $D_4$, 150 MA minimum. Tubes $V_2$ and $V_3$ are preferably type OB$_2$ voltage regulators. As noted, the output of the circuit incorporating such components is about 210 volts.

In FIGURE 5 of the drawings there is shown another electrical control circuit in accordance with the invention, but which does not include a vacuum tube. The circuit of FIGURE 5, except as hereinafter described, is a duplicate of the control circuit of FIGURE 4 and its similar components are indicated by the same letters and numerals preceded by the numeral 2. It is to be understood that this circuit will be supplied with electric current from the previously described power supply or its equivalent through the terminals $T_1$ and $T_2$.

In place of a vacuum tube, the circuit of FIGURE 5 employs a saturable reactor A as a magnetic amplifier. The reactor has an iron core, a control winding and an output winding having a very large number of turns. The control winding of this reactor is connected to a resistor-capacitor circuit similar to that shown in FIGURE 4 which is effective upon actuation to impress an exponentially varying potential across the control winding. Thus, one lead 102 of the control winding is connected through a current limiting resistor $R_{11}$ to resistor 2–$R_3$ (which corresponds to resistor $R_3$ in FIGURE 4). The other lead 103 of the control winding is connected to variable resistor 2–$R_7$ which can be adjusted to control the magnitude of the current drawn by the control winding. The output winding of the reactor is of two parts having a common lead 104 and end leads 105 and 106. Lead 104 is connected to a terminal $T_3$. A diode $D_5$ is connected from output winding lead 106 to lead 2–84 of the valve transducer coil 2–43 at junction 107. A reversely oriented diode $D_6$ is connected from junction 107 to a terminal $T_4$ through lead 2–101. Terminals $T_3$ and $T_4$ are connectable to a conventional source of alternating current.

A diode $D_7$ is connected from lead 105 to a junction 108, and a reversely oriented diode $D_8$ is connected from point 108 to terminal $T_4$, diode $D_8$ being reversely oriented with respect to diode $D_6$ which is also connected to terminal $T_4$.

Lead 2–87 from thermistor 2–44 is connected to point 108. A filter condenser $C_6$ is connected between leads 2–84 and 2–87.

The four diodes $D_5$–$D_8$ are so connected as to comprise a full wave bridge rectifier. Thus, when terminal $T_3$ is positive with respect to $T_4$, current flows from $T_3$ through lead 104 to the winding, then through lead 105, diode $D_7$, lead 2–87 to coil 2–43, and then through lead 2–84 to diode $D_6$ to $T_4$, the magnitude of the current depending on the impedance presented to it by the output winding. During the other half of the alternating current cycle, when $T_4$ is positive with respect to $T_3$, current flows from $T_4$ through $D_8$ to the transducer, then through $D_5$ to the winding, to $T_3$. It will be seen that the current is fully rectified and always passes through the transducer in the same direction. Condenser $C_6$ filters the current so that the potential across the coil is relatively constant over the entire input cycle. Resistor 2–$R_3$ is connected between terminal 2–$T_1$ and resistor 2–$R_7$, by-passing the control winding.

The saturable reactor A operates to control the current passing through the valve coil 2–43. The impedance of the output winding of the reactor, and therefore the magnitude of the valve coil current, is determined by, and varies with, the direct current in the control winding of the reactor. When the primary current is zero, the iron core is completely unsaturated; the self-inductance of the output winding is a maximum, and the current in the valve coil due to the potential applied at terminals $T_3$ and $T_4$ will be negligible. When the primary current is large, then the core will be completely saturated, the impedance of the output winding to the potential applied across $T_3$ and $T_4$ will be low, and a large current will flow in the valve.

The control circuit shown in FIGURE 5 is operated in the same manner as the circuit of FIGURE 4. With a regulated D.C. applied at terminals 2–$T_1$ and 2–$T_2$, and with an alternating current applied at $T_3$ and $T_4$, condensers 2–$C_1$ and 2–$C_2$ are charged by closing switches 2–$SW_1$ and 2–$SW_2$. The circuit is conditioned for operation as soon as the condensers are charged. (Since the current in the control winding is minimal during this time, the core of the reactor A is unsaturated and the impedance of the output winding is very high, and the valve coil is not energized.)

Switch 2–$SW_1$ is opened to cause a gradually increasing current to be applied to the valve coil 2–43. With this switch open, condenser 2–$C_1$ begins to discharge, while condenser 2–$C_2$ remains fully charged. As this occurs, a potential difference between the negatively charged sides of the two condensers dvelops, which is applied across the control winding. The potential difference gradually increases as condenser 2–$C_1$ continues to discharge, so that an increasing current flows in the control winding. This effects saturation of the core at progressively earlier in the voltage cycle across the output winding, so that the average impedance of the output winding is reduced, thereby increasing the current in the output winding and the valve coil.

When 2–$C_1$ is fully discharged, transducer current remains at a maximum value for as long as desired. The current is caused to gradually decrease by opening switch 2–$SW_2$ to cause condenser 2–$C_2$ to discharge. At the moment switch 2–$SW_2$ is opened, the potential across the control winding is a maximum; as the charge on 2–$C_2$ is discharged, the potential of the two negative sides of the condensers becomes more nearly equal, so that the current in the control winding decreases. Thus, the circuit of FIGURE 5 is functionally similar to the circuit of FIGURE 4 in the control which it exerts on change in valve response.

As previously explained, the resistor-capacitor circuit which is connected between tap 88, terminal $T_2$, resistor $R_7$, and the grid of tube $V_1$ in FIGURE 4, and which in FIGURE 5 is connected between tap 2–88, terminal 2–$T_2$, resistor 2–$R_7$ and resistor $R_{11}$, supplies a gradually changing output potential which, applied to the tube $V_1$ and magnetic amplifier A causes a gradual but non-linear change in valve setting. In some instances a lineally changing valve response may be desired. It has been established empirically that valve response itself does not vary lineally—changing current to the valve transducer 43 will not effect a linear time rate of change of valve response setting.

I have found, however, that linear valve response may be obtained by utilizing a circuit of the type shown in FIGURE 6. Otherwise put, I have found that if the valve current-time relationship is similar to the initial portion of a resistor-capacitor discharge curve, non-linearity of valve response with current change is offset or opposed by the non-linearity of the current-time relationship in such manner that a substantially straight line relationship between valve response and time is demonstrated.

In the circuit shown in FIGURE 6, a constant potential is impressed between leads 111 and 112, lead 111 being positive with respect to lead 112. A preferred but not a necessary source of this constant potential is the power supply circuit shown to the left of leads 111 and 112 and which is designated generally by 113.

The preferred power supply 113 shown includes a transformer 114 having primary leads 115 and 116 which are connectable to a conventional source of alternating current, and having secondary leads 117 and 118.

A resistor $R_{12}$ is connected between secondary lead 117 and a junction 120. A diode $D_9$ permitting current flow to the right in the figure is conncted between junction 120 and a junction 121. A diode $D_{10}$ is connected between junction 120 and a junction 122 in such manner as to permit current flow toward junction 120. Secondary lead 118 is connected to a junction 123. A capacitor $C_7$ is connected between junctions 121 and 123, and a second capacitor $C_8$ is connected between junctions 122 and 123. The portion of the power supply circuit 113 so far described, it will be seen, is a voltage doubler, condensers $C_7$ and $C_8$ charging through diodes $D_9$ and $D_{10}$ on opposite half-cycles of the transformer secondary current.

A resistor $R_{13}$ is connected between junction 121 and a junction 124. A Zener diode $D_{11}$ is connected between junction 124 and junction 122 through a lead 125. This diode $D_{11}$ establishes a constant potential between junctions 124 and 125, the former being positive with respect to the latter. Lead 111 is connected to junction 124, while lead 112 is connected to lead 125, so that the constant potential established by power supply 113 is impressed between leads 111 and 112.

A lead 130 is connected from lead 112 to the normally closed pole NC of a single pole double throw switch $SW_3$. A resistor $R_{14}$ having a tap 131 is connected at one end to the normally open pole NO of switch $SW_3$ and at the other end to lead 111, tap 131 also being connected to lead 111. A condenser $C_9$ is connected between lead 111 and the common pole of switch $SW_3$ through a lead 132.

A lead 133 is connected from lead 112 to the normally closed pole NC of a switch $SW_4$. The normally open pole NO of switch $SW_4$ is connected through a resistor $R_{15}$ having a tap 134 to lead 111, tap 134 also being connected to that lead. A condenser $C_{10}$ is connected between lead 111 and the common pole of switch $SW_4$ through a lead 135. A Zener diode $D_{12}$ is connected in such manner as to permit electrons to flow from lead 112 to lead 132 when the conduction potential of the diode is exceeded. Another Zener diode $D_{13}$ is connected in such manner as to permit electrons to flow from lead 112 to lead 135 when its conduction potential is exceeded. These two Zener diodes $D_{12}$ and $D_{13}$ are preferably selected to have conduction potentials equal to about ⅔ of the potential which is impressed between leads 111 and 112. For example, where the potential difference between leads 111 and 112 is 28 volts, diode $D_{12}$ should preferably conduct when the potential of lead 132 with respect to lead 112 is about 18 volts, and similarly diode $D_{13}$ should preferably conduct when lead 135 is about 18 volts positive with respect to lead 112.

A resistor $R_{16}$ having a tap 136 is connected between leads 132 and 135. Tap 136 is connected through a diode $D_{14}$ to the grid of a vacuum tube $3-V_1$, the diode preventing the flow of electrons from the grid toward tap 136.

A resistor $R_{17}$ having an adjustable tap 137 is connected from lead 132 to a junction 138, tap 137 also being connected to a junction 138. A resistor $R_{18}$ having an adjustable tap 140 is connected between lead 135 and a junction 141, tap 140 being connected to lead 135. Taps 137 and 140 of resistors $R_{17}$ and $R_{18}$ respectively are preferably ganged as shown for simultaneous movement. A Zener diode $D_{15}$ is connected between junctions 138 and 141 in such manner as to establish a potential drop from junction 138 to junction 141. A resistor $R_{19}$ is connected between junction 138 and the cathode of tube $3-V_1$. A resistor $R_{20}$ is connected between junction 138 and a junction 142. The plate and screen grid of tube $3-V_1$ are connected to the thermistor 3–44 and thermistor resistor $3-R_T$ of the valve assembly, the valve coil 3–43 being connected to junction 142. Leads 143 and 144 connect junctions 142 and 141 respectively to input terminals $3-T_1$ and $3-T_2$. A constant potential is impressed between these terminals $3-T_1$ and $3-T_2$, the former being positive with respect to the latter. This potential may be supplied, for example, from a power supply such as that shown in FIGURE 4.

In operation of the circuit of FIGURE 6, switches $SW_3$ and $SW_4$ are both initially in the normally closed positions as shown, so that leads 132 and 135 are both connected directly to lead 112 and are therefore at the same potential as that lead. The potential between leads 111 and 112 is impressed across capacitors $C_9$ and $C_{10}$, which both charge to that potential.

When switch $SW_3$ is actuated to the NO position, condenser $C_9$ begins to discharge through resistor $R_{14}$ at a rate which is determined by the setting of tap 131. The potential across condenser $C_9$ diminishes so that it does not completely offset the potential across $C_{10}$, with the result that lead 132 becomes positive with respect to lead 135. This potential difference will continue to increase in magnitude until the potential between lead 132 and lead 112 equals the conduction potential of Zener diode $D_{12}$, at which time that diode will conduct so that the potential between leads 132 and 112, and therefore the potential between leads 132 and 135, thereafter remains constant. When switch $SW_4$ is set in the NO position, condenser $C_{10}$ will begin to discharge through resistor $R_{15}$, so that the potential difference across condenser $C_{10}$, between leads 111 and 135, begins to rise whereby the potential difference between leads 132 and 135 is diminished. When the potential across Zener diode $D_{13}$ equals its conduction potential, it conducts so that leads 132 and 135 are both positive by the same amount with respect to lead 112, and are at the same potential as each other.

From the foregoing, it will be seen that as switches $SW_3$ and $SW_4$ are actuated the potential across resistor $R_{16}$ rises from zero to a maximum, and then drops to zero again. In effect, the two Zener diodes $D_{12}$ and $D_{13}$ limit the maximum potential across resistor $R_{16}$ to about ⅔ of the potential between leads 111 and 112, or, in other words, limit the discharge of condensers $C_9$ and $C_{10}$ to the initial portion of the exponential discharge curve which they would demonstrate in absence of the diodes. Although this initial portion of the curve is non-linear, I have found that its variation from linearity is such as to substantially offset the non-linearity of the valve response-current curve, so that an overall straight line rate of change of valve setting with time is displayed.

The variations in potential appearing across resistor $R_{16}$ are reflected between the grid and cathode of tube $3-V_1$ through resistors $R_{16}$, $R_{17}$, and $R_{18}$. In effect, the setting of tap 136 on resistor $R_{16}$ determines the maximum current applied to valve coil 3–43, while the settings of taps 137 and 140 on resistors $R_{17}$ and $R_{18}$ determine the minimum current applied to the valve coil.

Zener diode $D_{15}$ maintains a constant potential drop between junctions 138 and 141 since it is at all times in circuit connection between leads 143 and 144 through resistor $R_{20}$.

When both switches $SW_3$ and $SW_4$ are closed, leads 132 and 135 are at the same potential. No current flows in resistor $R_{16}$, so that the grid of tube $3-V_1$ is at this same potential. The potential of the grid with respect to the cathode is determined by the potential drops across resistors $R_{18}$ and $R_{19}$ and the constant drop across diode $D_{15}$. When tap 140 is set at the extreme right position on resistor $R_{18}$, the grid-cathode potential will be at its maximum negative value, and the minimum valve current will be the lowest possible value.

When switch $SW_3$ is set in NO position, a gradually increasing potential appears across resistor $R_{16}$, which is reflected in the grid-cathode potential to cause a gradually rising tube and coil current. The maximum value of this current is obtained by setting tap 136 at the top in the figure of resistor $R_{16}$. When switch $SW_4$ is opened, the valve current again decreases to a minimum value which is determined by the settings of taps 137 and 140.

The type of control over valve setting which the circuit of FIGURE 6 provides can best be seen by reference to FIGURE 7. Initially, with both switches $SW_3$ and $SW_4$ in NC position, valve setting is minimal, depending on the settings of taps 137 and 140 as explained. This minimal setting will become higher as the taps are moved to the left on their resistors. When $SW_3$ is moved to NO position valve setting rises lineally at a rate determined by the setting of tap 131, to a maximum determined by the setting of tap 136, and thereafter remains at that value until switch $SW_4$ is moved to NO position valve setting thereafter lineally decreases at a rate determind by the setting of tap 134, to a minimum determined by the settings of taps 137 and 140. Thus, the circuit of FIGURE 6 affords complete and independent control over all of the various variables.

It should be noted that the switches $SW_1$–$SW_4$ of the various circuits may be relay contacts actuable in response to a signal. Alternatively, the switches may be manually or mechanically actuated.

In the circuit which is illustrated in FIGURE 6, when the valve current has reached its maximum value, it remains at that maximum value until switch $SW_4$ is actuated to NO position, to start condenser $C_{10}$ discharging, and the valve current then diminishes. In some instances it may be desirable to automatically time the length of the period during which maximum valve setting is maintained. Powder compaction presses, for example, are sometimes operated to compress powdered material in a die at increasing pressure up to a maximum pressure, then to maintain that maximum pressure for a predetermined timed period, and then to gradually release the pressure on the powder. The circuit illustrated in FIGURE 8 provides for adjustable, automatically timed control of the period for which maximum valve setting is maintained.

The circuit shown in FIG. 8 differs from the circuit shown in FIG. 6 primarily by the provision of timing means which automatically establish a timed period beginning when the valve current reaches its maximum and at the end of which switch $SW_4$ is automatically moved to NO position to start current drop-off. The circuit of FIGURE 8 includes virtually all of the circuit elements of the circuit shown in FIGURE 6, and these elements bear the same numbers in FIGURE 8 as in FIGURE 6.

In addition to these circuit elements, the circuit of FIGURE 8 includes a resistor $R_{25}$ which is connected in line 132 between capacitor $C_9$ and Zener diode $D_{12}$. A lead 150 is connected from lead 132 at the left end of resistor $R_{25}$ to a resistor $R_{26}$ which is in series with the control grid of a thyratron tetrode $T_1$. A lead 151 is connected from lead 132 at the right end of resistor $R_{25}$ to the tap of a cathode biasing resistor $R_{27}$ which is connected to the cathode of thyratron $T_1$. The plate of tube $T_1$ is connected by a lead 152 to the coil of a control relay $CR_1$, the other lead of which is connected to the positive terminal 155 of a regulated D.C. power supply not shown. Control relay $CR_1$ operates contacts designated by $SW_5$. The cathode biasing resistor $R_{27}$ is connected to the negative terminal 156 of the regulated D.C. power supply. A potential of about 108 volts D.C. is preferably impressed between terminals 155 and 156. A resistor $R_{28}$ is connected between positive power supply terminal 155 and the cathode of tube $T_1$, and a Zener diode $D_{20}$ is connected between terminal 156 and the cathode of tube $T_1$ to permit the flow of electrons from junction 156 to resistor $R_{28}$. The screen grid of tube $T_1$ is connected to the cathode by a lead 160.

Switch $SW_4$, the actuation of which determines the start of the drop-off in valve setting, is operated by a relay $CR_2$. The coil leads of $CR_2$ are designated by 161 and 162. Lead 161 is connected through a resistor $R_{30}$ to the positive terminal 163 of a regulated D.C. power supply, and lead 162 is connected to the plate of a second thyratron $T_2$. A potential of about 210 volts D.C. is preferably impressed between terminals 163 and 164. The screen grid of thyratron $T_2$ is connected to terminal 163 of the power supply through a resistor $R_{31}$, and to the cathode of tube $T_2$ by a lead 165. The negative terminal 164 of the 210 v. power supply is connected to a biasing resistor $R_{32}$, the opposite side of which is connected to the cathode of tube $T_2$ by a lead 166. The control grid of tube $T_2$ is connected to a grid resistor $R_{34}$ the opposite side of which is connected to a junction 167. A timing capacitor $C_{12}$ is connected between junction 167 and a lead 168 which is connected to lead 166. A fixed resistor $R_{35}$ and a variable resistor $R_{36}$ are connected in parallel with capacitor $C_{12}$ between lead 168 and junction 167. Variable resistor $R_{36}$ has a tap 170 which is connected between it and resistor $R_{35}$. The common terminal of switch $SW_5$, which is operated by $CR_1$, is connected to resistor $R_{36}$ and junction 167. The normally closed pole NC of switch $SW_5$ is connected to negative power supply terminal 164 by a lead 172. Inasmuch as a 210 volt potential is also supplied between terminals 3–$T_1$ and 3–$T_2$, terminal 164 may be connected to terminal 3–$T_2$, and terminal 163 may be connected to terminal 3–$T_1$, by leads not shown.

The operation of the timed build-up-drop-off circuit of FIGURE 8 is identical to the operation of the circuit shown in FIGURE 6 in respect to the charging and discharging of condensers $C_9$ and $C_{10}$ and the operation of tube 3–$V_1$. The cycle is initiated by transferring switch $SW_3$ from NC to NO position, whereupon previously charged condenser $C_9$ begins to discharge through resistor $R_{14}$. When the potential between leads 112 and 132 equals the conduction potential of Zener diode $D_{12}$, that diode conducts and electrons flow through resistor $R_{25}$ to lead 150, so that lead 151 suddenly becomes negative with respect to lead 150 when Zener diode $D_{12}$ conducts.

Until this current flows through resistor $R_{25}$, tube $T_1$ is cut off. The flow of electrons from terminal 156 to terminal 155 through resistor $R_{27}$ holds the control grid of that tube negative with respect to the cathode when there is no current in $R_{25}$. When current begins to flow through resistor $R_{25}$, the potential appearing across that resistor suddenly offsets the drop across $R_{27}$ and makes the grid of tube $T_1$ positive with respect to the cathode, and thyratron $T_1$ fires, energizing control relay $CR_1$ and moving its associated switch $SW_5$ to the NO position.

Prior to the firing of tube $T_1$, thyratron $T_2$ is cut off. The flow of electrons from terminal 164 through $R_{32}$, leads 166 and 165 and $R_{31}$ to terminal 163, holds the grid negative, since the grid is connected to terminal 164 through switch $SW_5$ which is normally closed. A potential is thus applied across capacitor $C_{12}$ while $SW_5$ is closed, and $C_{12}$ charges by grid leak current which flows through resistor $R_{34}$.

Firing of tube $T_1$ and energization of the relay $CR_1$ opens switch $SW_5$, removing the charging potential across capacitor $C_{12}$, and that capacitor then starts to discharge at a rate which is determined by its value and the values of resistors $R_{35}$ and $R_{36}$. As capacitor $C_{12}$ discharges, the grid of tube $T_2$ becomes increasingly positive with respect to the cathode, until after a predetermined interval the grid potential becomes such that tube $T_2$ fires. The plate current of tube $T_2$ through lead 162 actuates control relay $CR_2$. When this occurs, switch $SW_4$ is moved to NO position and the drop off portion of the cycle begins, during which condenser $C_{10}$ discharges through resistor $R_{15}$. When the potential between lead 112 and lead 135 equals the conduction potential of Zener diode $D_{13}$, that diode conducts, maintaining the potential difference between those two leads constant thereafter, and the valve current is held at its minimum value.

To reset the circuit for another sequence, switch $SW_3$ is reset to the position shown in FIGURE 8 and the plate circuits of both tubes $T_1$ and $T_2$ are momentarily interrupted by suitable switch means not shown. Once resetting has taken place, the cycle can be repeated.

In the circuit of FIGURE 8, the timer whereby relay $CR_2$ is actuated at a controlled interval comprises a generally conventional thyratron grid leak timer circuit, which is started in operation by the opening of relay $CR_1$. It will be apparent that other means for timing the initiation of current drop off may be utilized.

The operation of the circuit illustrated in FIGURE 8 is shown graphically in FIGURE 9. When both $SW_3$ and $SW_4$ are in NC position, the current in the valve transducer 3–43 is minimal, depending upon the setting of taps 137 and 140 on resistors $R_{17}$ and $R_{18}$ respectively. When $SW_3$ is actuated to NO position, the current starts to increase at a rate determined by the setting of tap 131 on resistor $R_{14}$, and increases to a maximum determined by the setting of tap 136 on resistor $R_{16}$. Upon reaching this maximum, tube $T_1$ fires and $CR_1$ opens, thereby initiating the timing period established by variable resistor $R_{36}$. When $C_{12}$ has discharged to a potential such that tube $T_2$ fires, relay $CR_2$ is energized and $SW_4$ is actuated to NO position. Thereafter, valve setting decays at a rate determined by the setting of tap 134 on resistor $R_{15}$, to its original value. The changes of current with time in this circuit are such that an approximately linear change of valve response with time is demonstrated, because diodes $D_{12}$ and $D_{13}$ are selected to conduct when the potential across them is about 30% of the total voltage across capacitors $C_9$ and $C_{10}$, and the non-linearity of the intial part of the capacitor discharge offsets the previously described non-linearity in valve response to current.

By way of specific example, the parameters of a preferred circuit of the type illustrated in FIGURE 8 are as follows:

Potential between terminals 115 and 116, 115 volts A.C.

Potential between terminals 3–$T_1$ and 3–$T_2$, 210 volts D.C.

Potential between terminals 163 and 164, 210 volts D.C.

Potential between terminals 155 and 156, 108 volts D.C.

Potential between leads 111 and 112, 75 volts D.C.
Tube 3–$V_1$ is a type 6CZ5 pentode.
Tubes $T_1$ and $T_2$ are type 2D21 thyratrons.
$R_{14}$ and $R_{15}$, 12.5 megohms; $R_{16}$, $R_{17}$, and $R_{18}$, 5 megohms; $R_{19}$, 270 ohms; $R_{20}$, 82K ohms; 3–$R_T$, 5600 ohms; $R_{25}$, 10K ohms; $R_{26}$, 1 megohm; $R_{27}$, 5K ohms; $R_{28}$, 50K ohms; $R_{30}$, 5K ohms; $R_{31}$, 1 megohm; $R_{32}$, 5K ohms; $R_{34}$, 1 megohm; $R_{35}$, 50K ohms; $R_{36}$, 10 megohms.
$C_9$, $C_{10}$, and $C_{12}$, 12 mfd.
Zener diodes $D_{12}$, $D_{13}$, $D_{15}$, and $D_{20}$ are 25 volt diodes.

The invention is not limited to these circuits alone in combination with the valve, but includes other circuits capable of effecting similar control of valve response, in accordance with the following claims.

I claim:
1. Means providing a gradually changing output force comprising, an electromechanical transducer of the type providing an output force the magnitude of which varies with the magnitude of an electrical input applied to said transducer, a vacuum tube including a grid, a grid and a plate, means biasing said cathode negatively with respect to said cathode, means electrically connecting said plate and said transducer, and electric means for automatically increasing the grid voltage of said tube from a minimum value gradually to a maximum, holding said grid voltage at said maximum for a timed period, and then gradually reducing said voltage from said maximum back to said minimum, said electric means including a pair of individually chargeable and dischargeable resistor-capacitor circuits.

2. An electromagnetic transducer of the type providing a magnetomotive force for urging a valve element toward a port, said transducer being such that the magnitude of said magnetomotive force varies with the magnitude of an electric current supplied to said transducer; and an electric circuit connected to said transducer for supplying said current, said circuit including, positive and negative leads for connection to a source of constant potential, a condenser selectively connectable between said leads to be charged thereby, a resistor selectively connectable in circuit with said condenser to regulate the discharge thereof, potential limiting means for limiting the discharge of said condenser to the initial portion thereof, and means supplying a current to said transducer which varies in accordance with the discharge of said condenser.

3. The combination of claim 2 in which said potential limiting means permit said condenser to discharge to about ⅔ of the potential to which said condenser was charged.

4. An electric transducer of the type supplying a force for urging a valve element toward a port in accordance with the current applied to said transducer, and automatically operable electric circuit means connected to said transducer, said circuit comprising, first and second condensers which are chargeable in opposition to each other, resistive means for selectively discharging said condensers, means for limiting the potential across each condenser upon discharge thereof to a fraction of the potential to which said condenser was charged, and means operatively impressing the variation in the potential across both said condensers in the current applied to said transducer.

5. An electric transducer providing a magnetomotive force the magnitude of which varies with the magnitude of a current supplied to said transducer, first and second leads across which a constant potential is impressed, third and fourth leads each of which is selectively connectable to said second lead, a pair of capacitors respectively connected between said first and third leads and said first and fourth leads, a first resistor selectively connectable between said first lead and said third lead, a second resistor selectively connectable between said first and fourth leads, means permitting current to flow between said second and third leads when the potential therebetween is a preselected fraction of the potential impressed between said first and second leads, means permitting current to flow between said second and fourth leads when the potential therebetween is a preselected fraction of the potential impressed between said first and second leads, and means establishing a circuit connection between said third and fourth leads and said transducer.

6. An electric circuit comprising first and second leads for connection respectively to the negative and positive terminals of a source of constant potential, a vacuum tube including a grid, a cathode and a plate, a transducer coil, means connecting said transducer coil to said second lead, means biasing said cathode positive with respect to said first lead, a first resistor and capacitor connected in parallel between said grid and a junction, a second resistor and capacitor connected in parallel from said junction to said first lead, means including a switch disconnectably connecting said first lead to said grid, and means including a switch and a resistor disconnectably connecting said junction to said first lead.

7. Means for establishing a gradually increasing and a gradually decreasing lineal operating force on a valve element comprising, an electromagnet coil having a lineally actuable armature supplying a force proportioned to the magnitude of a current supplied to said coil, positive and negative leads for connection to a source of direct current, a vacuum tube including a cathode, a grid and a plate, means connecting said plate to said coil, means connecting said coil and said positive lead, means biasing said cathode positive with respect to said negative lead, a first resistor and capacitor connected in parallel between said grid and a junction, a second resistor and capacitor connected in parallel from said junction to said negative lead, means disconnectably connecting said negative lead to said grid, and means including a resistor disconnectably connecting said junction to said negative lead, whereby when said circuit is connected to said coil and is energized from a source a gradually rising force is supplied by said armature upon disconnecting said grid from said negative lead and further whereby a gradually decaying force is supplied by said armature upon disconnecting said junction from said negative lead.

8. An electromechanical transducer of the type delivering a lineal output force, an electric circuit for operating said transducer comprising, first and second leads for connection respectively to the negative and positive terminals of a source of constant potential, a vacuum tube including a grid, a cathode and a plate, means connecting said plate to said transducer, means connecting said transducer to said second lead, means biasing said cathode positive with respect to said first lead, a first variable resistor and capacitor connected in parallel between said grid and a junction, means for preventing the movement of electrons from said grid included between said grid and said first parallel connected resistor and capacitor, a second variable resistor and capacitor connected in parallel from said junction to said first lead, means including a switch disconnectably connecting said first lead to said grid, and means including a switch and a resistor disconnectably connecting said junction to said first lead.

9. A transducer circuit comprising, an electromechanical transducer delivering an input signal-proportioned output force, thermistor means in connection with said transducer for maintaining a temperature constant resistance, first and second leads for connection respectively to the negative and positive terminals of a source of constant potential, a vacuum tube including a grid, a cathode and a plate, means including said transducer connecting said plate to said second lead, resistive means effective to bias said cathode positive with respect to said first lead, a first variable resistor and capacitor connected in parallel between said grid and a junction, means for preventing the movement of electrons from said grid included between said grid and said first parallel connected resistor and capacitor, a second variable resistor and capacitor connected in parallel from said junction to said first lead, means including a switch disconnectably connecting said first lead to said grid, and means including a switch and a resistor disconnectably connecting said junction to said first lead.

10. An electric circuit comprising, a magnetic amplifier having a control winding and an output winding, leads for connection to a source of alternating voltage, an electromagnetic transducer delivering a lineal force proportioned to the magnitude of an input signal, rectifier means connecting said transducer to said leads through said output winding, positive and negative leads for connection to a source of direct current, means connecting said negative lead and a first end of said control winding, a first resistor and capacitor connected in parallel between a second end of said control winding and a junction, a second resistor and capacitor connected in parallel from said junction to said negative lead, means disconnectably connecting said second end of said control winding and said negative lead, and means including a resistor disconnectably connecting said junction to said negative lead, whereby when said circuit is energized from a source a gradually rising force is delivered by said transducer upon disconnecting said second end of said control winding from said negative lead and further whereby a gradually decaying force is delivered by said transducer upon disconnecting said junction from said negative lead.

11. Means for urging a movable valve element toward a control port comprising, a transducer, a magnetic amplifier having a control winding and an output winding, leads for connection to a source of alternating voltage, bridge rectifier means connecting said transducer to said leads through said output winding, positive and negative leads for connection to a source of direct current, current limiting means connecting said negative lead to one end of said control winding, a first variable resistor and capacitor connected in parallel between the other end of said control winding and a junction, a second variable resistor and capacitor connected in parallel from said junction to said negative lead, means including a switch disconnectably connecting said other end of said control winding to said negative lead, and means including a switch and a resistor disconnectably connecting said junction to said negative lead, whereby when said circuit is energized from a source a gradually rising current is supplied to said transducer upon disconnecting said other end of said control winding from said negative lead and further whereby a gradually decaying current is supplied to said transducer upon disconnecting said junction from said negative lead.

12. A fluid pressure control system for controlling pressure in a gradually changing manner, said system comprising a valve adapted to be operated by magnetomotive and fluid pressure forces, said valve including a control port, an element aligned with said port and urged away from it by fluid pressure at said port and urged in the opposite direction by said magnetomotive forces; an electric transducer for providing said magnetomotive forces; and an electric circuit including automatically operable means for supplying an electrical input to said transducer which changes gradually over a period of time, said circuit comprising first and second leads for connection respectively to the negative and positive terminals of a source of constant potential, a vacuum tube including a grid, a cathode and a plate, means connecting said transducer to said second lead, resistive means effective to bias said cathode positive with respect to said first lead, a first variable resistor and capacitor connected in parallel between said grid and a junction, a second variable resistor and capacitor connected in parallel from said junction to said first lead, means including a switch disconnectably connecting said first lead to said grid, and means including a switch and a resistor disconnectably connecting said junction to said first lead.

13. A fluid pressure control system for controlling pressure in a manner changing linearly with time, said system comprising, a valve having a movable valve member cooperable with a port, an electric transducer for supplying a force resiliently urging said valve member relative to said port in accordance with the current applied to said transducer means for applying a fluid pressure force at said port opposing the force of said transducer, and automatically operable electric circuit means connected to said transducer for causing said force to change linearly over an extended period of time, said circuit including, first and second condensers which are chargeable in opposition to each other, resistive means for selectively discharging said condensers, means for limiting the potential across each condenser upon discharge thereof to a fraction of the potential to which said condenser was charged, and means for reflecting the variation in the potential across both said condensers in the current applied to said transducer.

14. A fluid pressure control system for sequentially effecting gradual pressure changes, comprising a valve including a port, a control element adapted to be urged yieldably toward said port by magnetomotive forces, means for applying a fluid pressure force to said control element through said port in opposition to said magnetomotive forces, an electric transducer for providing said magnetomotive forces, said transducer including an armature connected to said control element, said transducer yieldably urging said control element in opposition to said pressure force with a magnetomotive force varying with the magnitude of an electrical current applied to said transducer, and an electric circuit for controlling said transducer, said electric circuit including automatically operable means for supplying a gradually changing electrical input to said transducer which causes the force delivered by said transducer to gradually increase to a preselected maximum, be maintained at said maximum for a predetermined interval, and then to decrease gradually.

References Cited by the Examiner

UNITED STATES PATENTS

| | | | |
|---|---|---|---|
| 2,085,086 | 6/1937 | Drake | 137—624.14 X |
| 2,444,295 | 6/1948 | Kaiser | 318—484 |
| 2,712,232 | 7/1955 | Pfeiffer | 317—142 X |
| 2,959,191 | 11/1960 | Schuman et al. | 137—625.61 |
| 3,046,470 | 7/1962 | Blocher | 317—148 |
| 3,112,418 | 11/1963 | Peras. | |

FOREIGN PATENTS 740,225  11/1955  Great Britain.

ISADOR WEIL, *Primary Examiner.*

D. LAMBERT, *Assistant Examiner.*